(12) United States Patent
Kawakami et al.

(10) Patent No.: US 11,407,911 B2
(45) Date of Patent: Aug. 9, 2022

(54) WATER-BASED INK FOR INK-JET RECORDING AND INK-JET RECORDING METHOD

(71) Applicant: Brother Kogyo Kabushiki Kaisha, Nagoya (JP)

(72) Inventors: Takefumi Kawakami, Nagoya (JP); Akihiko Taniguchi, Kakamigahara (JP); Hiroyuki Tanaka, Inazawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 234 days.

(21) Appl. No.: 16/413,841

(22) Filed: May 16, 2019

(65) Prior Publication Data

US 2019/0352523 A1 Nov. 21, 2019

(30) Foreign Application Priority Data

May 16, 2018 (JP) .............................. JP2018-094553

(51) Int. Cl.
*C09D 11/322* (2014.01)
*C09D 11/38* (2014.01)
(Continued)

(52) U.S. Cl.
CPC ............ *C09D 11/322* (2013.01); *C09D 11/38* (2013.01); *C09D 11/40* (2013.01)

(58) Field of Classification Search
CPC ....... C09D 11/322; C09D 11/38; C09D 11/40; C09D 11/326
(Continued)

(56) References Cited

U.S. PATENT DOCUMENTS 6,051,645 A 4/2000 Suzuki et al.
6,051,654 A 4/2000 Egashira et al.
(Continued)

FOREIGN PATENT DOCUMENTS

JP 2008174736 A 7/2008
JP 2008-246821 A 10/2008
(Continued)

OTHER PUBLICATIONS

Sep. 16, 2019—(EP) Extended Search Report—App 19174729.4.
(Continued)

*Primary Examiner* — Justin V Lewis
(74) *Attorney, Agent, or Firm* — Banner & Witcoff, Ltd.

(57) ABSTRACT

A water-based ink for ink-jet recording includes: a first resin-dispersed pigment, a second resin-dispersed pigment, and water, wherein the following conditions (1) and (2) are satisfied, $Q1 \geq 1.2$  Condition (1):
$Q2 < 1.2$  Condition (2):

in the conditions (1) and (2), Q1 and Q2 are represented by the following formulae (i) and (ii), respectively.

$Q1 = D1a/D1p$ (i)
$Q2 = D2a/D2p$ (ii)

D1$a$: an average particle size (nm) of the first resin-dispersed pigment after being mixed with an aqueous solution of calcium ions;
D1$p$: an average particle size (nm) of the first resin-dispersed pigment after being mixed with pure water;
D2$a$: an average particle size (nm) of the second resin-dispersed pigment after being mixed with an aqueous solution of calcium ions;

(Continued)

$D2p$: an average particle size (nm) of the second resin-dispersed pigment after being mixed with pure water.

9 Claims, 1 Drawing Sheet

(51) Int. Cl.
 *C09D 11/40* (2014.01)
 *C09D 11/326* (2014.01)
(58) Field of Classification Search
 USPC .......... 106/31.13, 31.28, 31.4, 31.41, 31.53,
  106/31.6, 31.72, 31.9
 See application file for complete search history.

(56) References Cited

U.S. PATENT DOCUMENTS

| | | |
|---|---|---|
| 8,016,404 B2 | 9/2011 | Kato et al. |
| 9,090,789 B2 | 7/2015 | Hakamada et al. |
| 2008/0152827 A1 | 6/2008 | Hakamada et al. |
| 2008/0241398 A1 | 10/2008 | Kato et al. |
| 2011/0187786 A1 | 8/2011 | Matsumoto et al. |
| 2012/0026240 A1 | 2/2012 | Saito |
| 2013/0224450 A1 | 8/2013 | Wingkono et al. |
| 2013/0278690 A1* | 10/2013 | Saito ............... B41J 2/2107 347/102 |
| 2014/0155535 A1 | 6/2014 | Lee et al. |
| 2014/0192111 A1 | 7/2014 | Nagai et al. |
| 2014/0287198 A1 | 9/2014 | Okuyama |
| 2017/0145232 A1 | 5/2017 | Bauer et al. |
| 2017/0355867 A1 | 12/2017 | Kasperchik et al. |
| 2018/0112091 A1 | 4/2018 | Masada et al. |

FOREIGN PATENT DOCUMENTS

| | | |
|---|---|---|
| JP | 2011-174044 A | 9/2011 |
| JP | 2012-046740 A | 3/2012 |
| JP | 2013-072044 A | 4/2013 |
| JP | 2013-253234 A | 12/2013 |
| JP | 2013-543934 A | 12/2013 |
| JP | 2014-184589 A | 10/2014 |
| JP | 2016-079359 A | 5/2016 |
| JP | 2017-014337 A | 1/2017 |
| JP | 6071729 B2 | 2/2017 |
| JP | 2017-109412 A | 6/2017 |
| JP | 2018-065956 A | 4/2018 |
| KR | 10-0536093 | 12/2005 |
| WO | 2012-057790 A1 | 5/2012 |
| WO | 2016/047588 A1 | 3/2016 |
| WO | 2016/175871 A1 | 11/2016 |

OTHER PUBLICATIONS

Nov. 30, 2021—(JP) Notice of Reasons for Refusal—App 2018-094553.

Jun. 14, 2022—(JP) Notice of Reasons for Refusal—App 2018-094553.

* cited by examiner

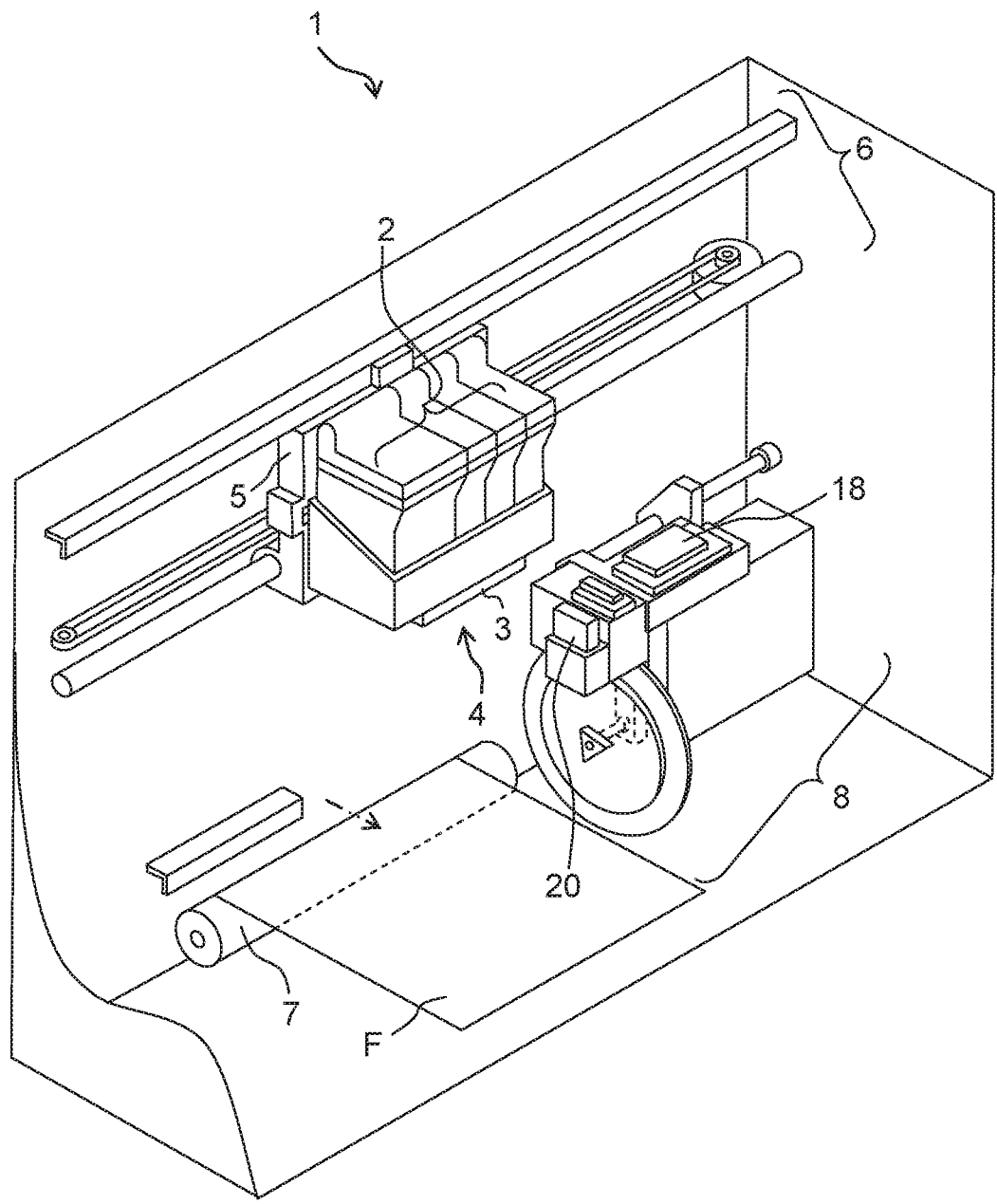

WATER-BASED INK FOR INK-JET RECORDING AND INK-JET RECORDING METHOD

CROSS REFERENCE TO RELATED APPLICATION

The present application claims priority from Japanese Patent Application No. 2018-094553 filed on May 16, 2018, the disclosure of which is incorporated herein by reference in its entirety.

BACKGROUND OF THE INVENTION

Field of the Invention

The present teaching relates to a water-based ink for ink-jet recording.

Description of the Related Art

For example, when ink-jet recording using a pigment ink is performed on recording paper including water-soluble calcium salt, which functions as a binder reacting with the pigment ink, chromaticness (C*) and/or an optical density (OD value) is/are higher than that/those obtained by ink-jet recording on paper including no binder (Published Japanese Translation of PCT International Publication for Patent Application No. 2013-543934).

SUMMARY

When recording is performed on paper including the binder by use of an ink containing a pigment that has a high aggregation property with calcium ions, although the optical density (OD value) and the like is high, the ink is not likely to spread over the paper and color unevenness occurs. When recording is performed on the paper including the binder by use of an ink containing a pigment that has no aggregation property with calcium ions, although no color unevenness occurs, the optical density (OD value) and the like is not high.

In view of the above, an object of the present teaching is to provide a water-based ink for ink-jet recording that is capable of inhibiting color unevenness and enhancing chromaticness (C*) and/or an optical density (OD value) when recording is performed on paper including a binder that reacts with pigment ink.

According to a first aspect of the present teaching, there is provided a water-based ink for ink-jet recording including: a first resin-dispersed pigment, a second resin-dispersed pigment, and water, wherein the following conditions (1) and (2) are satisfied, $Q1 \geq 1.2$  Condition (1):

$Q2 < 1.2$  Condition (2):

in the conditions (1) and (2), Q1 and Q2 are represented by the following formulae (i) and (ii), respectively.

$Q1 = D1a/D1p$  (i)

$Q2 = D2a/D2p$  (ii)

D1a: an average particle size (nm) of the first resin-dispersed pigment in a mixture of 5% by mass of aqueous dispersion of the first resin-dispersed pigment and 1,000 ppm of aqueous solution of calcium ions (mixture ratio: 1:1), the average particle size being measured, by a dynamic light scattering method, after mixing the aqueous dispersion of the first resin-dispersed pigment and the aqueous solution of calcium ions for one minute;

D1p: an average particle size (nm) of the first resin-dispersed pigment in a mixture of 5% by mass of aqueous dispersion of the first resin-dispersed pigment and pure water (mixture ratio: 1:1), the average particle size being measured, by the dynamic light scattering method, after mixing the aqueous dispersion of the first resin-dispersed pigment and the pure water for one minute;

D2a: an average particle size (nm) of the second resin-dispersed pigment in a mixture of 5% by mass of aqueous dispersion of the second resin-dispersed pigment and 1,000 ppm of aqueous solution of calcium ions (mixture ratio: 1:1), the average particle size being measured, by the dynamic light scattering method, after mixing the aqueous dispersion of the second resin-dispersed pigment and the aqueous solution of calcium ions for one minute;

D2p: an average particle size (nm) of the second resin-dispersed pigment in a mixture of 5% by mass of aqueous dispersion of the second resin-dispersed pigment and pure water (mixture ratio: 1:1), the average particle size being measured, by the dynamic light scattering method, after mixing the aqueous dispersion of the second resin-dispersed pigment and the pure water for one minute.

According to a second aspect of the present teaching, there is provided an ink-jet recording method, including discharging the water-based ink for ink-jet recording of the first aspect on recording paper including water-soluble calcium salt in accordance with an ink-jet system.

BRIEF DESCRIPTION OF THE DRAWINGS

FIGURE is a perspective view of an exemplary schematic configuration of an ink-jet recording apparatus of the present teaching.

DESCRIPTION OF THE EMBODIMENTS

A water-based ink for ink-jet recording according to the present teaching (hereinafter referred to as a water-based ink or an ink in some cases) is explained below. The water-based ink according to the present teaching contains a first resin-dispersed pigment (first resin-dispersible pigment, first resin dispersion type pigment), a second resin-dispersed pigment (second resin-dispersible pigment, second resin dispersion type pigment), and water.

The first resin-dispersed pigment is dispersed in the water-based ink by a first resin dispersant. The second resin-dispersed pigment is dispersed in the water-based ink by a second resin dispersant. A pigment usable as each of the first and second resin-dispersed pigments may be any pigment dispersible in water by a resin for dispersing pigment (resin dispersant), which is exemplified, for example, by carbon black, an inorganic pigment, and an organic pigment. The carbon black is exemplified, for example, by furnace black, lamp black, acetylene black, and channel black. The inorganic pigment is exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Specific examples of these pigments include C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19, 196; C. I. Pigment Blues 1, 2, 3, 15, 15:1, 15:2, 15:3, 15:4, 16, 22, and 60; and solid solutions of the above-described pigments.

The first resin-dispersed pigment has a high aggregation property with calcium ions, and the second resin-dispersed pigment has a low aggregation property with calcium ions. Specifically, the first resin-dispersed pigment and the second resin-dispersed pigment satisfy the following conditions (1) and (2), respectively.

$$Q1 \geq 1.2 \qquad \text{Condition (1):}$$

$$Q2 < 1.2 \qquad \text{Condition (2):}$$

Q1: A quotient (Q1=D1a/D1p) obtained as follows. 5% by mass of aqueous dispersion of the first resin-dispersed pigment is mixed with 1,000 ppm of aqueous solution of calcium ions (mixture ratio: 1:1), followed by being stirred or agitated for one minute. Then, its average particle size (D1a) is measured by a dynamic light scattering method. 5% by mass of aqueous dispersion of the first resin-dispersed pigment is mixed with pure water (mixture ratio: 1:1) instead of being mixed with 1,000 ppm of aqueous solution of calcium ions, followed by being stirred or agitated for one minute. Then, its average particle size (D1p) is measured by the dynamic light scattering method. The average particle size D1a is divided by the average particle size D1p, thus obtaining the quotient Q1.

Q2: A quotient (Q2=D2a/D2p) obtained as follows. 5% by mass of aqueous dispersion of the second resin-dispersed pigment is mixed with 1,000 ppm of aqueous solution of calcium ions (mixture ratio: 1:1), followed by being stirred or agitated for one minute. Then, its average particle size (D2a) is measured by a dynamic light scattering method. 5% by mass of aqueous dispersion of the second resin-dispersed pigment is mixed with pure water (mixture ratio: 1:1) instead of being mixed with 1,000 ppm of aqueous solution of calcium ions, followed by being stirred or agitated for one minute. Then, its average particle size (D2p) is measured by the dynamic light scattering method. The average particle size D2a is divided by the average particle size D2p, thus obtaining the quotient Q2.

The aqueous solution of calcium ions may be prepared, for example, by using water-soluble calcium salt, such as calcium chloride. The average particle diameter can be measured as arithmetic mean of particle diameter, for example, by using a dynamic light scattering particle diameter distribution measuring apparatus "LB-550" manufactured by HORIBA, LTD. The quotient Q1 and the quotient Q2 can be calculated, for example, by using the following formulae (i) and (ii), respectively.

$$Q1 = D1a/D1p \qquad \text{(i)}$$

D1a: An average particle size (nm) of the first resin-dispersed pigment after being mixed with the aqueous solution of calcium ions (mixture ratio: 1:1)

D1p: An average particle size (nm) of the first resin-dispersed pigment after being mixed with the pure water (mixture ratio: 1:1)

$$Q2 = D2a/D2p \qquad \text{(ii)}$$

D2a: An average particle size (nm) of the second resin-dispersed pigment after being mixed with the aqueous solution of calcium ions (mixture ratio: 1:1)

D2p: An average particle size (nm) of the second resin-dispersed pigment after being mixed with the pure water (mixture ratio: 1:1)

The water-based ink of the present teaching contains both the first resin-dispersed pigment having a high aggregation property with calcium ions and the second resin-dispersed pigment having a low aggregation property with calcium ions. This allows the water-based ink to easily spread over the paper surface while maintaining the aggregation property with calcium ions. When recording is performed on paper including a binder (for example, water-soluble calcium salt) that reacts with pigment ink, it is possible to inhibit color unevenness and to enhance chromaticness (C*) and/or an optical density (OD value).

The quotient Q1 and the quotient Q2 are adjustable by changing, for example, an acid value, a weight average molecular weight, a backbone or skeleton, and a content of the first resin dispersant for dispersing the first resin-dispersed pigment (the first resin dispersant of the first resin-dispersed pigment) and the second resin dispersant for dispersing the second resin-dispersed pigment (the second resin dispersant of the second resin-dispersed pigment).

For example, an acid value (A1) of the first resin dispersant is lower than an acid value (A2) of the second resin dispersant. Intermolecular repulsion in each resin dispersant is more likely to be weakened due to reaction with calcium ions derived, for example, from water-soluble calcium salt in recording paper, as the acid value of each resin dispersant is lower. This causes aggregation easily. The acid value (A1) is, for example, equal to or less than 100 mgKOH/g. In a practical aspect, the acid value (A1) is equal to or more than 10 mgKOH/g. The acid value (A2) is, for example, equal to or more than 200 mgKOH/g. In a practical aspect, the acid value (A2) is equal to or less than 1000 mgKOH/g.

The weight average molecular weight of the first and resin dispersants is, for example, in a range of 1,000 to 100,000, in a range of 2,500 to 50,000, or in a range of 5,000 to 20,000.

The first and second resin dispersants are exemplified, for example, by block copolymers, graft copolymers, random copolymers or salts thereof, which are composed of hydrophobic monomer and acid or acid derivatives monomer. The hydrophobic monomer is exemplified, for example, by styrene, styrene derivatives, vinyl naphthalene, vinyl naphthalene derivatives, α,β-ethylene-unsaturated carboxylate aliphatic alcohol ester. The acid or acid derivatives monomer is exemplified, for example, by acrylic acid, acrylic acid derivatives, maleic acid, maleic acid derivatives, itaconic acid, itaconic acid derivatives, fumaric acid, and fumaric acid derivatives. The hydrophobic monomer may be used alone or in a combination of two or more thereof. The acid or acid derivatives monomer may be used alone or in a combination of two or more thereof.

For example, the ratio (mass ratio) of the mass of the first resin dispersant to the mass of the first resin-dispersed pigment is smaller than the ratio (mass ratio) of the mass of the second resin dispersant to the mass of the second resin-dispersed pigment. Intermolecular repulsion in each resin dispersant is more likely to be weakened by reaction with calcium ions derived, for example, from water-soluble calcium salt in recording paper, as the ratio (mass ratio) of the mass of each resin dispersant to the mass of each resin-dispersed pigment is lower. This causes aggregation easily. The ratio of the mass of the first resin dispersant to the mass of the first resin-dispersed pigment is, for example, in a range of 5 parts by mass to 50 parts by mass with respect to 100 parts by mass of the first resin-dispersed pigment (the solid content amount of pigment). The ratio of the mass of the second resin dispersant to the mass of the second resin-dispersed pigment is, for example, in a range of 10 parts by mass to 100 parts by mass or equal to or more than 40 parts by mass with respect to 100 parts by mass of the second resin-dispersed pigment (the solid content amount of pigment).

The content (X) of the first resin-dispersed pigment in the entire amount of the water-based ink is, for example, in a range of 0.5% by mass to 20% by mass, in a range of 1% by mass to 15% by mass, or in a range of 1% by mass to 10% by mass. The content (X) means a solid content amount of pigment and thus it does not include the content of the resin dispersant.

The content (Y) of the second resin-dispersed pigment in the entire amount of the water-based ink is, for example, in a range of 0.5% by mass to 20% by mass, in a range of 1% by mass to 15% by mass, or in a range of 1% by mass to 10% by mass. The content (Y) means a solid content amount of pigment and thus it does not include the content of the resin dispersant.

The mass ratio of the content (X) of the first resin-dispersed pigment to the content (Y) of the second resin-dispersed pigment in the entire amount of the water-based ink satisfies, for example, X/Y=0.1 to 4, X/Y=0.3 to 3.5, X/Y=1.5 to 3.5, or X/Y=1.5 to 2.5. Satisfying X/Y=1.5 to 3.5 results in the water-based ink having a sufficiently high optical density (OD value).

The water is preferably ion-exchange water or purified water (pure water). The content of the water in the entire amount of the water-based ink may be, for example, in a range of 10% by mass to 90% by mass, in a range of 40% by mass to 80% by mass, or in a range of 50% by mass to 80% by mass. The content of the water in the entire amount of the water-based ink may be, for example, a balance of the other components.

The water-based ink may further contain a penetrant that adjusts, for example, the dry speed of the water-based ink on a recording medium.

An example of the penetrant is glycol ether. Examples of the glycol ether include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Those may be used alone or in a combination of two or more thereof. Among them, triethylene glycol-n-butyl ether is preferably used.

The content of the penetrant(s) in the entire amount of the water-based ink is, for example, in a range of 0% by mass to 20% by mass, in a range of 0% by mass to 15% by mass, in a range of 1% by mass to 6% by mass, or in a range of 4% by mass to 6% by mass.

Making the content of the penetrant(s) in the entire amount of the water-based ink 4% by mass to 6% by mass and satisfying X/Y=1.5 to 2.5 results in the water-based ink that is capable of sufficiently inhibiting color unevenness and having a sufficiently high optical density (OD value).

The water-based ink may further contain a water-soluble organic solvent different from the penetrant. The water-soluble organic solvent different from the penetrant is exemplified, for example, by a humectant that inhibits ink from drying at an end of a nozzle in an ink-jet head.

Examples of the humectant include, but not limited to, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Those may be used alone or in a combination of two or more thereof. Among them, polyvalent alcohol(s) such as alkylene glycol and glycerol is/are preferably used.

The content of the humectant(s) in the entire amount of the water-based ink is, for example, in a range of 0% by mass to 95% by mass, in a range of 5% by mass to 80% by mass, or in a range of 5% by mass to 50% by mass.

The water-based ink may further contain a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol and cellulose.

The water-based ink can be prepared, for example, by uniformly mixing, for example, the first resin-dispersed pigment, the second resin-dispersed pigment, the water, and an optionally other additive(s) as necessary, by a conventionally known method, and then removing any non-dissolved matter, with a filter or the like.

As described above, the water-based ink for ink-jet recording of the present teaching contains both the pigment having the high aggregation property with calcium ions and the pigment having the low aggregation property with calcium ions. This allows the water-based ink to easily spread over the paper surface while maintaining the aggregation property with calcium ions. When recording is performed on paper including the binder, it is possible to inhibit color unevenness and to enhance chromaticness (C*) and/or an optical density (OD value).

Subsequently, an ink-jet recording apparatus of the present teaching is explained.

The ink-jet recording apparatus of the present teaching is an ink-jet recording apparatus including: an ink accommodating section and an ink jetting mechanism. Ink is accommodated in the ink accommodating section and the ink accommodated in the ink accommodating section is jetted by the ink jetting mechanism. The water-based ink for ink-jet recording of the present teaching is accommodated in the ink accommodating section.

FIGURE depicts an exemplary configuration of the ink-jet recording apparatus of the present teaching. As depicted in FIGURE, an ink-jet recording apparatus 1 includes four ink cartridges 2, an ink jetting mechanism (ink-jet head) 3, a head unit 4, a carriage 5, a driving unit 6, a platen roller 7 and a purge device 8 as main constitutive components or parts of the ink-jet recording apparatus 1.

Each of the four ink cartridges 2 contains one of four water-based inks of yellow, magenta, cyan, and black. For example, at least one of the four water-based inks is the water-based ink of the present teaching. In this example, a set with the four ink cartridges 2 is explained. However, instead of this set, the present teaching may use an integrated type ink cartridge of which interior is comparted (partitioned) to form a water-based yellow ink accommodating section, a water-based magenta ink accommodating section, a water-based cyan ink accommodating section, and a water-based black ink accommodating section. As a body of the ink cartridge, for example, any conventionally known main body of an ink cartridge may be used.

The ink-jet head 3 disposed on the head unit 4 performs recording on a recording medium P (e.g., recording paper). The four ink cartridges 2 and the head unit 4 are provided or arranged on the carriage 5. The driving unit 6 causes the carriage 5 to reciprocate in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 has a spatula shape, and wipes a nozzle-formed surface of the ink-jet head 3 accompanying with the movement (reciprocating movement) of the carriage 5. In FIGURE, a cap 18 is provided to cover nozzles of the ink-jet head 3 that is returned to a reset position upon completion of recording, so as to inhibit the water-based inks from drying.

In the ink-jet recording apparatus 1 of this example, the four ink cartridges 2 are provided, together with the head unit 4, on one carriage 5. The present teaching, however, is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 via tubes, etc., and the water-based inks are supplied from the four ink cartridges 2, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

Ink-jet recording using the ink-jet recording apparatus 1 is performed, for example, as follows. At first, the recording paper P is supplied or fed from a paper feeding cassette or paper feeding cassette (not depicted in the drawing) arranged at a side of or at a position below the ink-jet recording apparatus 1. The recording paper P is introduced or guided between the ink-jet head 3 and the platen roller 7. Then, predefined recording is performed on the fed or introduced recording paper P with the water-based ink(s) jetted from the ink-jet head 3. The recording paper P after recording is discharged from the ink-jet recording apparatus 1. In FIGURE, illustration of the feed mechanism and discharge mechanism for the recording paper P is omitted.

In the apparatus depicted in FIGURE, a serial type ink-jet head is adopted. The present teaching, however, is not limited to this. The ink-jet recording apparatus may be an apparatus adopting a line type ink-jet head.

The ink-jet recording method of the present teaching is characterized by performing recording by jetting a water-based ink onto a recording medium in accordance with an ink-jet system, wherein the water-based ink for ink-jet recording of the present teaching is used as the water-based ink. The recording medium may be recording paper including water-soluble calcium salt. The recording includes printing a letter (text), printing an image, printing, etc.

EXAMPLES

Next, Examples of the present teaching are explained together with Comparative Examples. Note that the present teaching is not limited to or restricted by Examples and Comparative Examples described below.

[Preparation of Pigment Dispersion Liquid]

Purified water was added to 20% by mass of a pigment (C.I. Pigment Red 122) and 6% by mass of a sodium hydroxide neutralized product of a styrene-acrylic acid copolymer (acid value 80 mgKOH/g, molecular weight 10,000), so that the sum of them was 100% by mass, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture obtained was filtrated through a cellulose acetate filter (pore size 3.00 μm). A first resin-dispersed magenta pigment liquid A was thus obtained. The solid content of the first resin-dispersed magenta pigment liquid A was 15.6% by mass, wherein the pigment solid content amount was 12% by mass and the resin amount was 3.6% by mass (30 parts by mass with respect to 100 parts by mass of the pigment (solid content)). The styrene-acrylic acid copolymer was a water-soluble polymer that was generally used as the resin dispersant of the resin-dispersed pigment. The same is true of a first resin-dispersed magenta pigment liquid B and a second resin-dispersed magenta pigment liquid C.

The first resin-dispersed magenta pigment liquid B was obtained similarly to the first resin-dispersed magenta pigment liquid A, except that a sodium hydroxide neutralized product of the styrene-acrylic acid copolymer having an acid value 100 mgKOH/g was used. The solid content of the first resin-dispersed magenta pigment liquid B was 15.6% by mass, wherein the pigment solid content amount was 12% by mass and the resin amount was 3.6% by mass (30 parts by mass with respect to 100 parts by mass of the pigment (solid content)).

The second resin-dispersed magenta pigment liquid C was obtained similarly to the first resin-dispersed magenta pigment liquid A, except that a sodium hydroxide neutralized product of the styrene-acrylic acid copolymer having an acid value 150 mgKOH/g was used. The solid content of the second resin-dispersed magenta pigment liquid C was 16.8% by mass, wherein the pigment solid content amount was 12% by mass and the resin amount was 4.8% by mass (40 parts by mass with respect to 100 parts by mass of the pigment (solid content)).

The quotient Q1 was determined by using the first resin-dispersed magenta pigment liquids A and B, and the quotient Q2 was determined by using the second resin-dispersed magenta pigment liquid C. The results are shown in Table 1.

Examples 1 to 9 and Comparative Examples 1 to 3

Respective components included in the water-based ink composition (Table 1), except for the first resin-dispersed magenta pigment liquids A, B and the second resin-dispersed magenta pigment liquid C, were mixed uniformly or homogeneously; and thus an ink solvent was obtained. Subsequently, the ink solvent was added to the first resin-dispersed magenta pigment liquid A or B and the second resin-dispersed magenta pigment liquid C (the ink solvent was added only to the second resin-dispersed magenta pigment liquid C in Comparative Example 1, only to the first resin-dispersed magenta pigment liquid A in Comparative Example 2, and to the first resin-dispersed magenta pigment liquids A and B in Comparative Example 3), followed by being mixed uniformly, and thus mixtures were obtained. After that, each mixture obtained was filtrated through a cellulose acetate membrane filter (pore size 3.00 μm) manufactured by TOYO ROSHI KAISHA, LTD., and thus water-based pigment ink indicated in each of Examples 1 to 9 and Comparative Examples 1 to 3 in Table 1 was obtained.

With respect to the water-based inks in Examples 1 to 9 and Comparative Examples 1 to 3, (a) Evaluation of optical density (OD value) and (b) Evaluation of color unevenness were performed by the following methods.

(a) Evaluation of Optical Density (OD value)

A digital multifunctional peripheral DCP-J4225N equipped with an ink-jet printer manufactured by Brother Industries, Ltd. was used to record a single-color patch with the water-based ink in each of Examples 1 to 9 and Comparative Examples 1 to 3 on recording paper (Reytoday Copy manufactured by International paper Company) including the binder. The Optical density (OD value) of three locations or portions in each of the single-color patches was measured by using a spectrophotometric colorimetry meter SpectroEye (light source: D50; field: 2'; ANSI-T) manufactured by X-Rite Inc. Then, an average value thereof was found and evaluated in accordance with the following evaluation criteria.

<Evaluation Criteria for Optical Density (OD value) Evaluation>

A: The optical density (OD value) on the paper including the binder was equal to or more than 0.80;
B: The optical density (OD value) on the paper including the binder was equal to or more than 0.75 and less than 0.80;
C: The optical density (OD value) on the paper including the binder was less than 0.75.

Instead of the recording paper including the binder, single-color patches were recorded on recording paper including no binder (MULTI PAPER SUPER WHITE+ manufactured by ASKUL CORPORATION) and measurement of the optical density (OD value) was performed similarly to the above. Then, the difference (A−B) between the optical density A (OD value A) on the paper including the binder and the optical density B (OD value B) on the paper including no binder was calculated. The calculation results are indicated in Table 1 together with the evaluation results of optical density (OD value).

(b) Color Unevenness Evaluation

The single-color patches recorded similarly to the optical density (OD value) evaluation were observed visually and using 20-power magnifying glass and evaluated in accordance with the following evaluation criteria.

<Evaluation Criteria for Color Unevenness Evaluation>

A: Color unevenness was inconspicuous when observing with the magnifying glass;
B: Although color unevenness was observed with the magnifying glass, no color unevenness was observed visually;
C: Color unevenness was observed visually.

Table 1 indicates the water-based ink compositions and the evaluation results of Examples 1 to 9 and Comparative Examples 1 to 3.

Table 1 (following)—LEGEND

1: Nonionic surfactant produced by Nissin Chemical Industry Co., Ltd.; the numeric value in Table 1 indicates the active ingredient amount.

Unit of the water-based ink composition is % by mass.

TABLE 1

| | | | | Examples | | | | | | | | |
|---|---|---|---|---|---|---|---|---|---|---|---|---|
| | | | | 1 | 2 | 3 | 4 | 5 | 6 | 7 | 8 | 9 |
| Water-based ink composition | Pigment dispersion liquid | First resin-dispersed pigment (X) | Magenta pigment liquid A (Q1 = 5.0) | 25.9 | 23.8 | 20.0 | 15.8 | 7.7 | 23.8 | 23.8 | 23.8 | — |
| | | | Magenta pigment liquid B (Q1 = 1.2) | — | — | — | — | — | — | — | — | 23.8 |
| | | Second resin-dispersed pigment (Y) | Magenta pigment liquid C (Q2 = 1.0) | 7.4 | 9.5 | 13.3 | 17.5 | 25.6 | 9.5 | 9.5 | 9.5 | 9.5 |
| | Penetrant | Triethylene glycol-n-butyl ether | | 4 | 4 | 4 | 4 | 4 | 2 | 6 | 7 | 4 |
| | Humectant | Glycerol | | 17.2 | 17.2 | 17.2 | 17.2 | 17.2 | 17.2 | 17.2 | 17.2 | 17.2 |
| | Surfactant | Olfin (tradename) E1010 (*1) | | 0.5 | 0.5 | 0.5 | 0.5 | 0.5 | 0.5 | 0.5 | 0.5 | 0.5 |
| | | Water | | balance | balance | balance | balance | balance | balance | balance | balance | balance |
| | | X/Y | | 3.5 | 2.5 | 1.5 | 0.9 | 0.3 | 2.5 | 2.5 | 2.5 | 2.5 |
| | | Optical density (OD value) | | A | A | A | B | B | A | A | B | A |
| | | Optical density (OD value) (A) on paper including binder | | 0.82 | 0.82 | 0.81 | 0.78 | 0.79 | 0.82 | 0.81 | 0.79 | 0.82 |

TABLE 1-continued

| | | | | | | | | | |
|---|---|---|---|---|---|---|---|---|---|
| Optical density (OD value) (B) on paper including no binder | (0.78) | (0.77) | (0.78) | (0.75) | (0.76) | (0.77) | (0.78) | (0.77) | (0.77) |
| (A − B) | (0.04) | (0.05) | (0.03) | (0.03) | (0.03) | (0.05) | (0.03) | (0.02) | (0.05) |
| Color unevenness | B | A | A | A | A | B | A | A | A |

| | | | | Comparative Examples | | |
|---|---|---|---|---|---|---|
| | | | | 1 | 2 | 3 |
| Water-based ink composition | Pigment dispersion liquid | First resin-dispersed pigment (X) | Magenta pigment liquid A (Q1 = 5.0) | — | 33 | 23.8 |
| | | | Magenta pigment liquid B (Q1 = 1.2) | — | — | 9.5 |
| | | Second resin-dispersed pigment (Y) | Magenta pigment liquid C (Q2 = 1.0) | 33 | — | — |
| | Penetrant | | Triethylene glycol-n-butyl ether | 4 | 4 | 4 |
| | Humectant | | Glycerol | 17.2 | 17.2 | 17.2 |
| | Surfactant | | Olfin (tradename) E1010 (*1) | 0.5 | 0.5 | 0.5 |
| | | | Water | balance | balance | balance |
| X/Y | | | | 0 | — | — |
| Optical density (OD value) | | | | C | A | A |
| Optical density (OD value) (A) on paper including binder | | | | 0.73 | 0.81 | 0.81 |
| Optical density (OD value) (B) on paper including no binder | | | | (0.74) | (0.78) | (0.77) |
| (A − B) | | | | (−0.01) | (0.03) | (0.04) |
| Color unevenness | | | | A | C | C |

As indicated in Table 1, Examples 1 to 9 had the evaluation results of the optical density (OD value) better than Comparative Example 1 that did not contain the first resin-dispersed pigment. Further, in each of Examples 1 to 9, the difference (A–B) between the optical density (OD value) (A) on the paper including the binder and the optical density (OD value) (B) on the paper including no binder was a positive value, and improvement of the optical density (OD value) due to the aggregation of pigment was confirmed. Examples 1 to 9 had the evaluation results of the color unevenness better than Comparative Examples 2 and 3 that did not contain the second resin-dispersed pigment. In Examples 1 to 3, 6, 7, and 9 in which X/Y=1.5 to 3.5 was satisfied, the evaluation results of the optical density (OD value) were especially good. In Examples 2, 3, 7, and 9 in which the content of the penetrant was in a range of 4% by mass to 6% by mass and X/Y=1.5 to 2.5 was satisfied, the evaluation results of the optical density (OD value) and the color unevenness were especially good.

As described above, the water-based ink according to the present teaching is capable of inhibiting color unevenness and enhancing chromaticness (C*) and/or optical density (OD value), when the water-based ink is used for recording on paper including the binder that reacts with pigment ink. The way of use of the water-based ink of the present teaching is not particularly limited to the recording on the paper including the binder and is widely applicable to ink-jet recording on a variety of recording mediums.

What is claimed is:

1. A water-based ink for ink-jet recording comprising: a first resin-dispersed pigment, a second resin-dispersed pigment, and water,
wherein:

$Q1 \geq 1.2$; and $Q2 < 1.2$ where:

$Q1 = D1a/D1p$; and $Q2 = D2a/D2p$;

D1a: an average particle size, in nanometers, of the first resin-dispersed pigment in a mixture of 5% by mass of aqueous dispersion of the first resin-dispersed pigment and 1,000 ppm of aqueous solution of calcium ions, the mixture having a mixture ratio of 1:1;

D1p: an average particle size, in nanometers, of the first resin-dispersed pigment in a mixture of 5% by mass of aqueous dispersion of the first resin-dispersed pigment and pure water, the mixture having a mixture ratio of 1:1;

D2a: an average particle size, in nanometers, of the second resin-dispersed pigment in a mixture of 5% by mass of aqueous dispersion of the second resin-dispersed pigment and 1,000 ppm of aqueous solution of calcium ions, the mixture having a mixture ratio of 1:1;

D2p: an average particle size, in nanometers, of the second resin-dispersed pigment in a mixture of 5% by mass of aqueous dispersion of the second resin-dispersed pigment and pure water, the mixture having a mixture ratio of 1:1.

2. The water-based ink for ink-jet recording according to claim 1, wherein a mass ratio of a content X, of the first resin-dispersed pigment to a content Y, of the second resin-dispersed pigment in an entire amount of the water-based ink satisfies X/Y=1.5 to 3.5.

3. The water-based ink for ink-jet recording according to claim 1, further comprising a penetrant,
   wherein a content of the penetrant in an entire amount of the water-based ink is in a range of 4% by mass to 6% by mass, and
   a mass ratio of a content X, of the first resin-dispersed pigment to a content Y, of the second resin-dispersed pigment in the entire amount of the water-based ink satisfies X/Y=1.5 to 2.5.

4. The water-based ink for ink-jet recording according to claim 3, wherein the penetrant is triethylene glycol-n-butyl ether.

5. The water-based ink for ink-jet recording according to claim 1, wherein an acid value of a first resin dispersant dispersing the first resin-dispersed pigment is lower than an acid value of a second resin dispersant dispersing the second resin-dispersed pigment.

6. The water-based ink for ink-jet recording according to claim 5, wherein the acid value of the first resin dispersant is equal to or less than 100 mgKOH/g.

7. The water-based ink for ink-jet recording according to claim 1, wherein a ratio of a mass of a first resin dispersant dispersing the first resin-dispersed pigment to a mass of the first resin-dispersed pigment is lower than a ratio of a mass of a second resin dispersant dispersing the second resin-dispersed pigment to a mass of the second resin-dispersed pigment.

8. The water-based ink for ink-jet recording according to claim 7, wherein the ratio of the mass of the second resin dispersant to the mass of the second resin-dispersed pigment is equal to or more than 40 parts by mass to 100 parts by mass of the second resin-dispersed pigment.

9. An ink-jet recording method, comprising discharging the water-based ink for ink-jet recording as defined in claim 1 on recording paper including water-soluble calcium salt.

* * * * *